United States Patent
Hung et al.

(10) Patent No.: US 11,163,338 B2
(45) Date of Patent: Nov. 2, 2021

(54) FLEXIBLE CONDUCTIVE MEMBER WITHIN HINGE OF COMPUTING DEVICE TO SELECTIVELY MAKE CONDUCTIVE CONTACT WITH ANTENNA

(71) Applicant: HEWLETT-PACKARD DEVELOPMENT COMPANY, L.P., Houston, TX (US)

(72) Inventors: Chih Chen Hung, Taipei (CN); Chun-Chih Liu, Taipei (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 630 days.

(21) Appl. No.: 16/077,299

(22) PCT Filed: Apr. 18, 2017

(86) PCT No.: PCT/US2017/028080
§ 371 (c)(1),
(2) Date: Aug. 10, 2018

(87) PCT Pub. No.: WO2018/194558
PCT Pub. Date: Oct. 25, 2018

(65) Prior Publication Data
US 2021/0181806 A1 Jun. 17, 2021

(51) Int. Cl.
G06F 1/16 (2006.01)
H01Q 1/22 (2006.01)

(52) U.S. Cl.
CPC .......... *G06F 1/1681* (2013.01); *G06F 1/1616* (2013.01); *G06F 1/1698* (2013.01); *H01Q 1/2266* (2013.01); *H01Q 1/2291* (2013.01)

(58) Field of Classification Search
CPC .... G06F 1/1681; G06F 1/1616; G06F 1/1698; H01Q 1/2266; H01Q 1/243; H01Q 1/2291
See application file for complete search history.

(56) References Cited

U.S. PATENT DOCUMENTS 6,531,985 B1 3/2003 Jones et al.
2002/0021250 A1 2/2002 Asano et al.
(Continued)

FOREIGN PATENT DOCUMENTS

JP 2010166395 7/2010
WO 2013060683 A1 5/2013
WO WO-2016179304 A1 11/2016

OTHER PUBLICATIONS

Chen et al., "LTE/WWAN Monopole Antenna For Laptop Computer Applications", IEEE Xplore Digital Library, Retrieved from Internet: http://ieeexplore.ieee.org/stamp/stamp.jsp?arnumber=7465355, 2016, 2 Pages.

*Primary Examiner* — James Wu
(74) *Attorney, Agent, or Firm* — Michael A. Dryja (57) ABSTRACT

A computing device can include a first component, a second component, and a hinge rotatably coupling the first component and the second component. The second component is rotatable about the hinge between a closed position and an open position in relation to the first component. The computing device includes an antenna disposed at the second component, and a flexible conductive member disposed within the hinge. The flexible conductive member has a first end fixedly connected to the first component and a second end. The second end of the flexible conductive member conductively contacts the antenna in the open position and does not conductively contact the antenna in the closed position.

15 Claims, 6 Drawing Sheets

(56) References Cited

U.S. PATENT DOCUMENTS

| | | | |
|---|---|---|---|
| 2003/0045246 A1* | 3/2003 | Lee | H01Q 1/246 455/575.1 |
| 2003/0234743 A1* | 12/2003 | Leon | H01Q 1/44 343/702 |
| 2005/0231431 A1* | 10/2005 | Pan | H01Q 1/1207 343/702 |
| 2006/0002058 A1* | 1/2006 | Zaderej | H04M 1/0216 361/679.27 |
| 2008/0100514 A1* | 5/2008 | Abdul-Gaffoor | H01Q 1/243 343/702 |
| 2010/0067186 A1* | 3/2010 | Aya | G06F 1/1616 361/679.28 |
| 2013/0077224 A1 | 3/2013 | Mo et al. | |
| 2014/0097993 A1 | 4/2014 | Hotta et al. | |
| 2014/0292613 A1 | 10/2014 | Hsiao et al. | |
| 2014/0361932 A1 | 12/2014 | Irci et al. | |
| 2015/0244059 A1 | 8/2015 | Onaka et al. | |
| 2015/0255851 A1* | 9/2015 | Guterman | H05K 1/0215 343/702 |
| 2016/0111777 A1 | 4/2016 | Yang | |
| 2016/0261022 A1 | 9/2016 | Guterman et al. | |

* cited by examiner

FLEXIBLE CONDUCTIVE MEMBER WITHIN HINGE OF COMPUTING DEVICE TO SELECTIVELY MAKE CONDUCTIVE CONTACT WITH ANTENNA

BACKGROUND

Portable computing devices can include laptop computers, which are also referred to as notebook computers. Like other types of computing devices, such as desktop computers, laptop computers are commonly connected to networks, including the Internet. Due to their portability, laptop computers are often wirelessly connected to such networks, such as over Wi-Fi, as opposed to being connected to a network in a wired manner using a network cable.

DETAILED DESCRIPTION

As noted in the background section, portable computing devices like laptop computers are often wirelessly connected to networks like the Internet. A portable computing device thus can include a wireless transceiver that wirelessly sends and receives data to another network device, like a wireless router or access point. To maximize the distance and throughput at which the wireless transceiver of a portable computing device can communicate with a wireless router or access point, the portable computing device usually includes an antenna, which for at least aesthetic purposes may be internal to the device.

A portable computing device like a laptop computer can include a top component including a display and a bottom component including a keyboard and a touchpad or another user input device. The top and bottom components are rotatable about a hinge that couples the two components. In a closed position, the top component is positioned against the bottom component for storage and transportation; the display is usually opposite the keyboard and touchpad when the portable computing device is closed. In an open position, the top component is rotated away from the bottom component, rendering the display viewable and the keyboard and touchpad usable.

A portable computing device can wirelessly communicate with another network device just when it was in an open position, when a user was more likely to be actively using the computing device. When in the closed position, the portable computing device may have been turned off or placed in a sleep state, when wireless communication was less desired if not impossible. Therefore, traditionally portable computing devices have had antennas that were positioned for maximum wireless communication distance and throughput when the computing devices were opened.

However, more recently portable computing devices continue to wirelessly communicate even when they are in a closed position. For example, a laptop computer may still be placed in a sleep state when closed, but may automatically awaken periodically to check for email or other types of messages. As such, a laptop computer having an antenna that is positioned for maximum wireless communication distance and throughput just when in the open position may be unable to permit the computer to wirelessly communicate when in the closed position.

Example computing devices described herein can have two antennas. One antenna of an example computing device may be positioned within a hinge that rotatably couples the top and bottom components of the computing device. A wireless transceiver of the computing device may excitably use this antenna regardless of whether the computing device is opened or closed. A second antenna may be positioned within the top component of the computing device, near the surface thereof that is revealed when the computing device is in the open position. The wireless transceiver may also excitably use this antenna, but just when the computing device is opened. Excitable usage of an antenna can mean energizing the antenna 208 to communicate data.

An example computing device can have a flexible conductive member, such as a spring, which is disposed within the hinge. One end of the conductive member may be fixedly connected to the computing device's bottom component and conductively coupled to the wireless transceiver, whereas the other end may be freely movable within the hinge. Rotation of the top component relative to the bottom component from the closed position to the open position can cause the conductive member to unwind within the hinge and make conductive contact with the top component's antenna so that the wireless transceiver excitably uses this antenna in addition to the antenna in the hinge when the computing device is open.

By comparison, rotating the top component relative to the bottom component from the open position back to the closed position can cause the conductive member to wind within the hinge so that it no longer makers conductive contact with the antenna within the top component. As such, in the closed position the wireless transceiver no longer can excitably use this antenna, and thus just uses the antenna in the hinge when the computing device is closed. In this way, the flexible conductive member disposed within the hinge may permit the usage of the antenna within the top component of the computing device just when the computing device is opened, and not when closed.

Figure 1A:
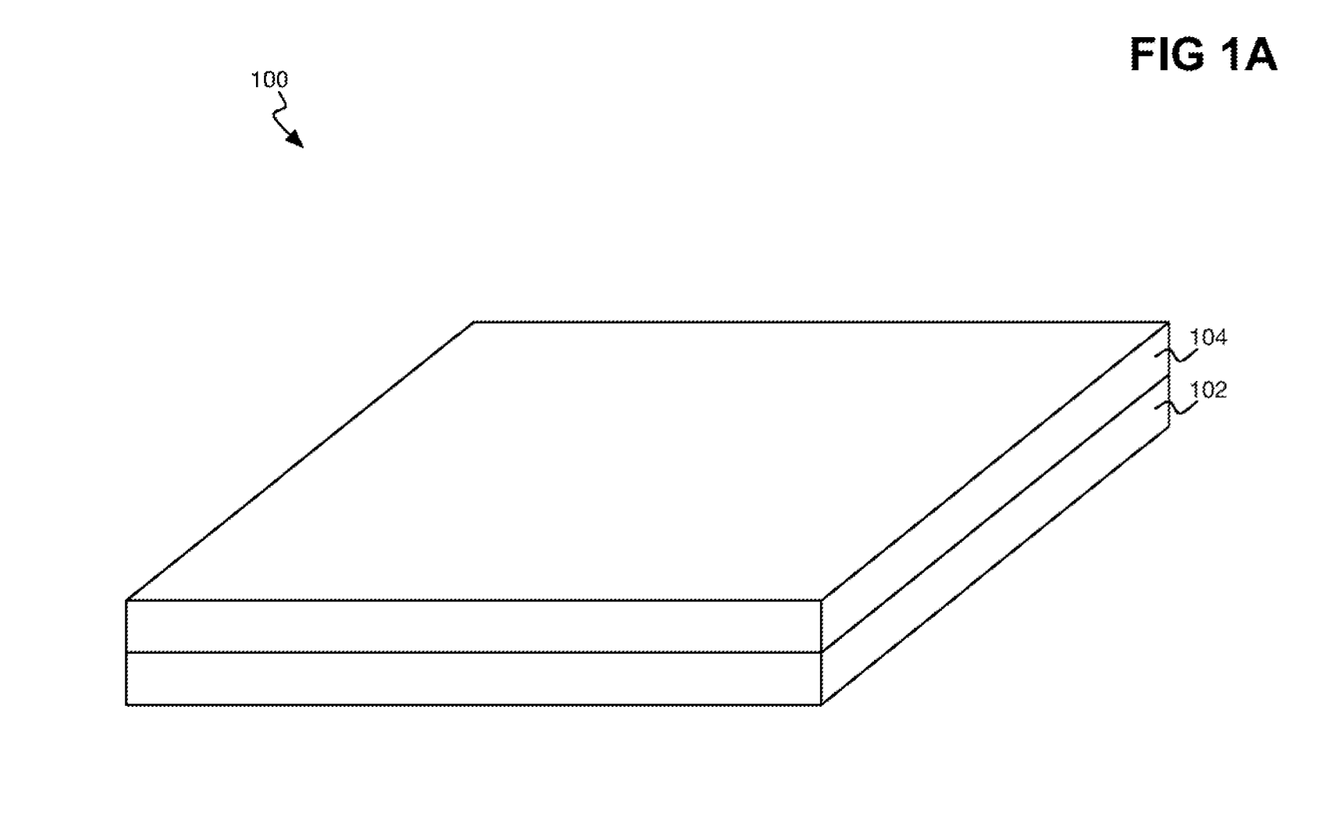
FIGS. 1A and 1B are perspective diagrams of an example portable computing device in a closed position and in an open position, respectively.
Figure 1B:
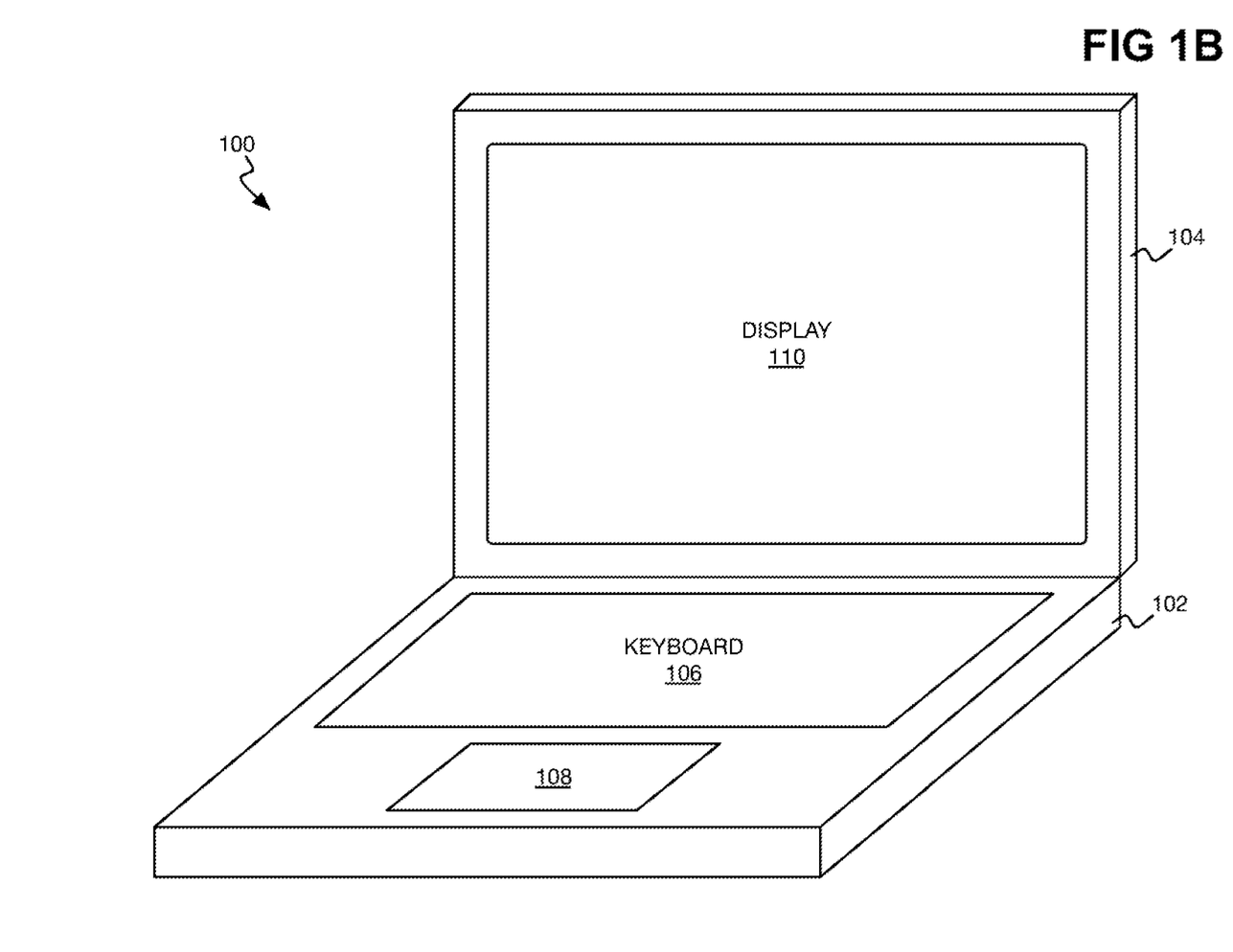

FIGS. 1A and 1B show an example portable computing device 100, such as a laptop or notebook computer. The computing device 100 is depicted in a closed position in FIGS. 1A and 1n an open position in FIG. 1B. The computing device 100 includes a bottom, or first, component 102 and a top, or second, component 104. In the closed position of FIG. 1A, the top component 104 is flush against the bottom component 102. The components 102 and 104 are rotatably coupled to one another to transition between the closed and open positions of FIGS. 1A and 1B.

In the open position of FIG. 1B, the top component 104 is rotated relative to the bottom component 102 so that the components 102 and 104 are not flush against one another. The bottom component 102 can include user input devices, such as a keyboard 106 and a touchpad 108, which are revealed in the open position of FIG. 1B and hidden in the closed position of FIG. 1A. The top component 104 can include a display device 110, such as a liquid crystal display (LCD), which is likewise revealed in the open position of FIG. 1B and hidden in the closed position of FIG. 1A.

Figure 2:
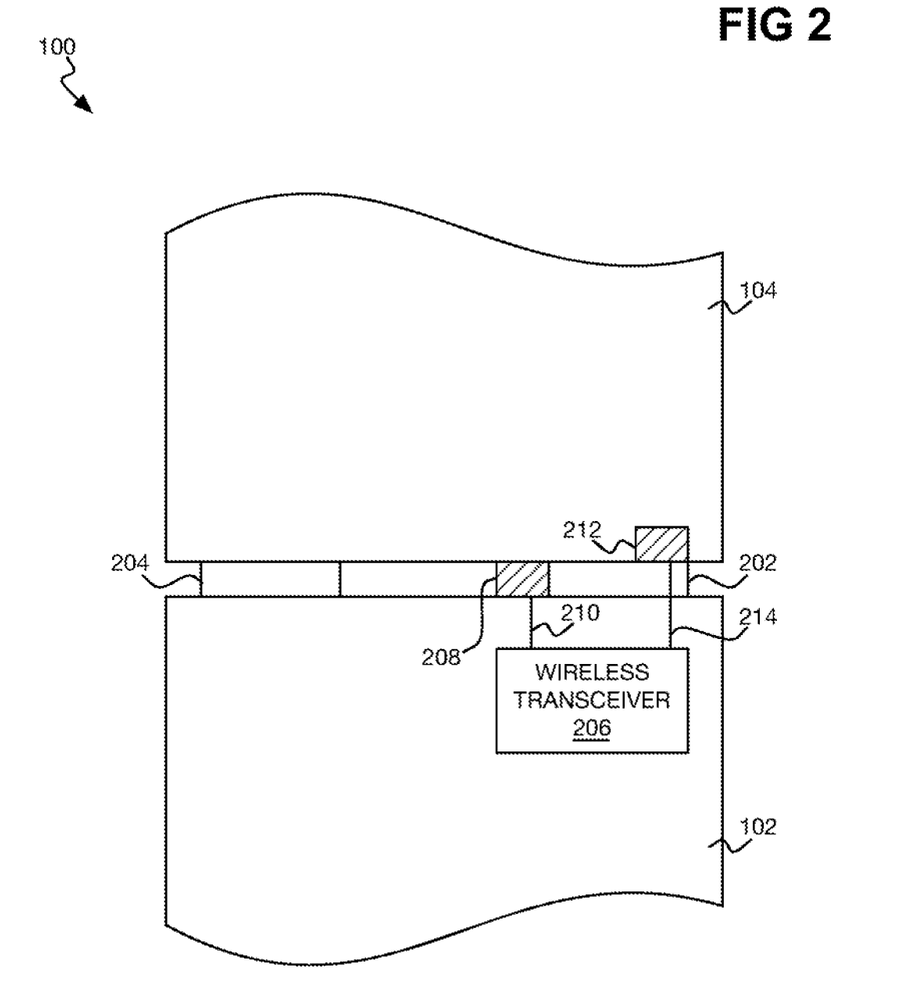
FIG. 2 is a top view of an example portable computing device, such as the computing device of FIGS. 1A and 1B in an open position.
Figure 3A:
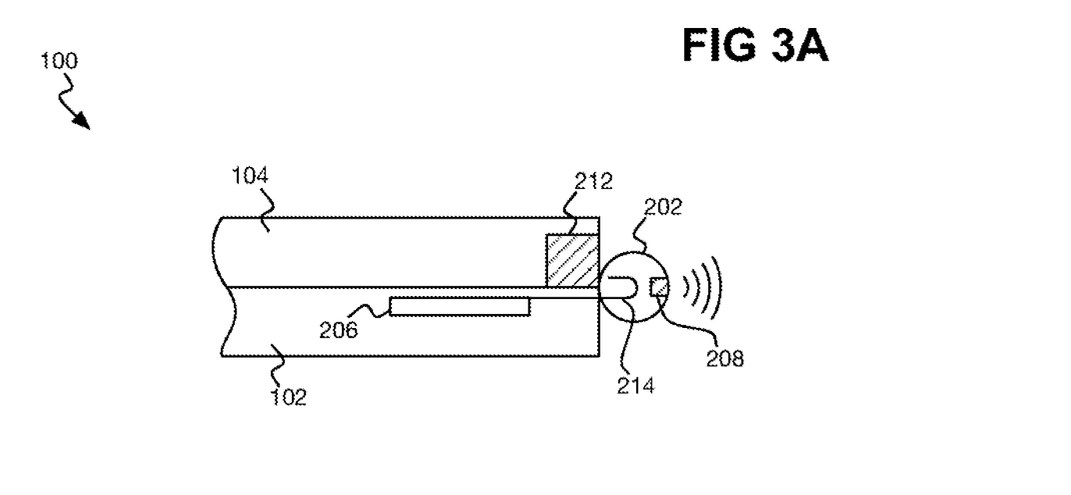
FIGS. 3A and 3B are side views of the example computing device of FIG. 2 in a closed position and in an open position, respectively.
Figure 3B:
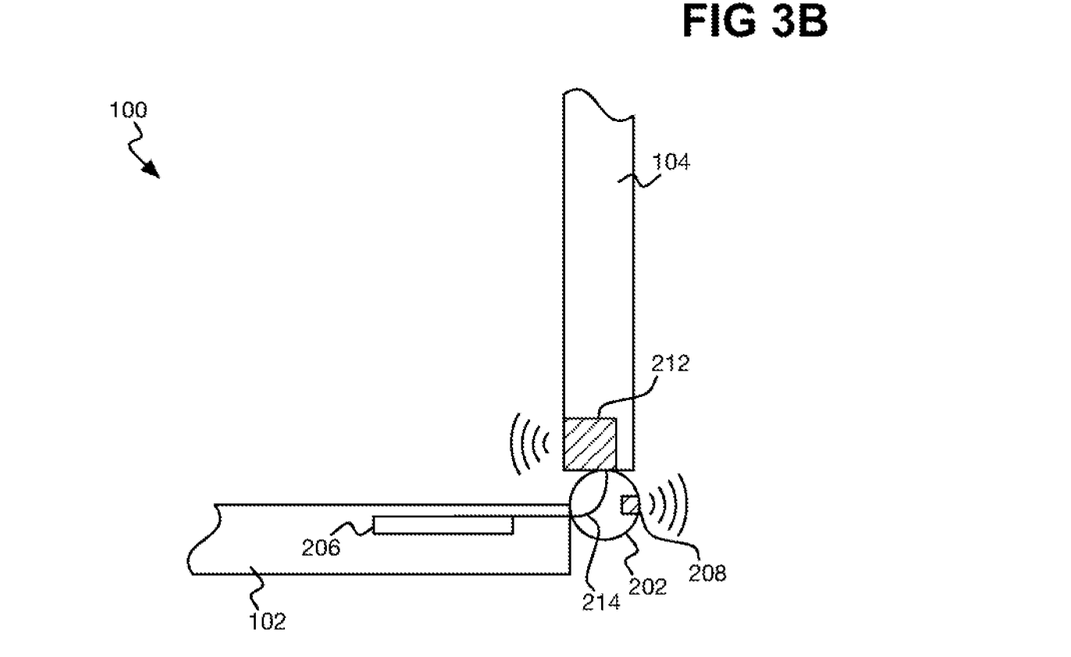

FIGS. 2, 3A, and 3B show how the components 102 and 104 of the computing device 100 can be rotatably coupled to one another in one example. FIG. 2 shows an example top view of the computing device 100 as fully opened, such that the top component 102 (a portion of which is depicted in FIG. 2) is rotated 180 degrees relative to the bottom component 104 (a portion of which is depicted in FIG. 2). A pair of hinges 202 and 204 rotatably couple the components 102 and 104 to one another. The keyboard 106, the touchpad 108, and the display device 110 are not depicted in FIG. 2 for illustrative clarity and convenience.

The computing device 100 includes a wireless transceiver 206, which may be a Wi-Fi wireless transceiver, for instance. The wireless transceiver 206 can be disposed within the bottom component 102. The computing device 100 includes a first antenna 208 disposed at the hinge 202. A first conductor 210, such as a wire, a conductive trace, or other conductive member, conductively couples the wireless transceiver 206 to the antenna 208. The computing device 100 includes a second antenna 212 disposed at the top component 104. A second conductor 214, such as a wire, a conductive trace, or other conductive member, conductively couples the wireless transceiver 206 to the antenna 212, through the hinge 202.

FIGS. 3A and 3B show example side views of the computing device 100 in a closed position and in an open position, respectively. In both figures, the conductor 210 of FIG. 2 coupling the wireless transceiver 206 to the antenna 208 disposed at the hinge 202 is not depicted for Illustrative clarity. In FIG. 3A, the top component 104 is flush against the bottom component 102. In this closed position, the conductor 214 is wound within the hinge 202 so that it does not make conductive contact with the antenna 212. Therefore, when the computing device 100 is closed, the wireless transceiver 206 can just excitably use the antenna 208 at the hinge 202 (i.e., energizes or excites the antenna 208 to communicate data).

In FIG. 3B, the top component 104 is rotated away in relation to the bottom component 102. In this open position, the conductor 214 is unwound within the hinge 212 so that it makes conductive contact with the antenna 212. Therefore, when the computing device 100 is open, the wireless transceiver 206 can excitably use both the antenna 208 at the hinge 202 and the antenna 212 at the top component 104. Rotation of the top component 104 from the closed position of FIG. 3A to the open position of FIG. 3B thus permits the conductor 214 to unwind within the hinge 202, causing the conductor 214 to contact the component 104 and make conductive contact with the antenna 212.

Rotation of the top component 104 from the open position of FIG. 3B back to the closed position of FIG. 3A causes the conductor 214 to wind within the hinge 202, resulting in the conductor 214 no longer contacting the component 104 and breaking conductive contact with the antenna 212. The wireless transceiver 206 is thus conductively connected to the antenna 208 at the hinge 202 regardless of whether the computing device 100 is in the closed position of FIG. 3A or in the open position of FIG. 3B. However, the wireless transceiver 206 is conductively connected to the antenna 212 at the top component 104 just when the computing device 100 is open, such as in the open position of FIG. 3B, and not when the computing device 100 is in the closed position of FIG. 3A.

Figure 4A:
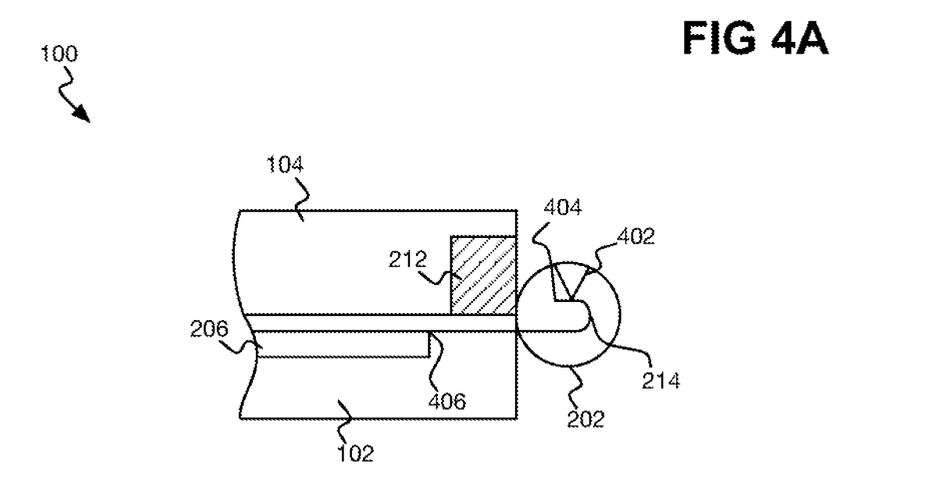
FIGS. 4A and 4B are side views of the example computing device of FIG. 2 in more detail than in FIGS. 3A and 3B.
Figure 4B:
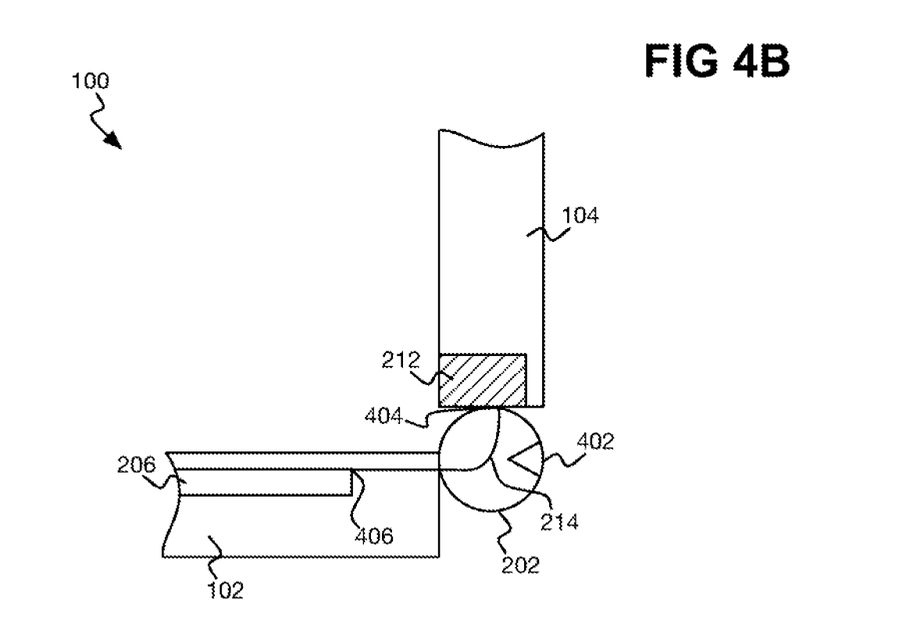

FIGS. 4A and 4B show the example side views of the computing device 100 of FIGS. 3A and 3B, respectively, in greater detail. The conductor 214 can be a flexible conductor, such as a flat tension spring having a default unwound position. The conductor 214 includes a first end 406 that is fixedly attached to the bottom component 102, specifically to the wireless transceiver 206. The conductor 214 includes a second end 404 that, by comparison, is freely movable. The hinge 202 can include an internal tab 402 that rotates in correspondence with rotation of the top component 104 relative to the bottom component 102 about the hinge 202.

In the closed position of FIG. 4A, the tab 402 of the hinge 202 pushes against, and thus compresses or winds, the conductor 214 within the hinge 202. The freely movable end 404 of the conductor 214 thus is positioned within the hinge 202, and does not make contact with the top component 104. Therefore, the end 404 of the conductor 214 does not make conductive contact with the antenna 212 at the top component 104.

Rotating the top component 104 relative to the bottom component 102 to transition the computing device 100 from the closed position of FIG. 4A to the open position of FIG. 48 correspondingly causes the tab 402 to rotate within the hinge 202. As such, the conductor 214 is permitted to unwind towards its default unwound position, until the freely movable end 404 makes physical contact with the top component 104, and therefore conductive contact with the antenna 212 at the top component 104. The wireless transceiver 206 can thus excite the antenna 212 to use the antenna 212 during wireless communication, because the transceiver 206 is conductively connected to the antenna 212.

Rotation of the components 102 and 104 relative to one another to again transition the computing device 100 to the closed position of FIG. 4A from the open position of FIG. 4B correspondingly causes the tab 402 to rotate within the hinge 202. The tab 402 again makes contact with the conductor 214, compressing or wind the conductor 214 so that its freely movable end 404 is no longer in physical contact with the top component 104 and no longer in conductive contact with the antenna 212. The wireless transceiver 206 can no longer excite the antenna 212 and cannot use the antenna 212 during wireless communication, because the transceiver 206 is no longer conductively connected to the antenna 212.

The conductor 214 therefore makes selective conductive contact with the antenna 212 in correspondence with the rotatable position of the top component 104 relative to the bottom component 102 of the computing device 100. As the top component 104 is rotated away from the bottom component 102 about the hinge 202, transitioning the computing device 100 from the closed position of FIG. 4A to the open position of FIG. 4B, the conductor 214 unwinds within the hinge 202 and makes conductive contact with the antenna 212. When the top component 104 is rotated back towards the bottom component 102 about the hinge 202, transitioning the computing device 100 from the open position of FIG. 4B back to the closed position of FIG. 4A, the conductor 214 winds within the hinge 202 and again no longer makes conductive contact with the antenna 212.

Figure 5A:
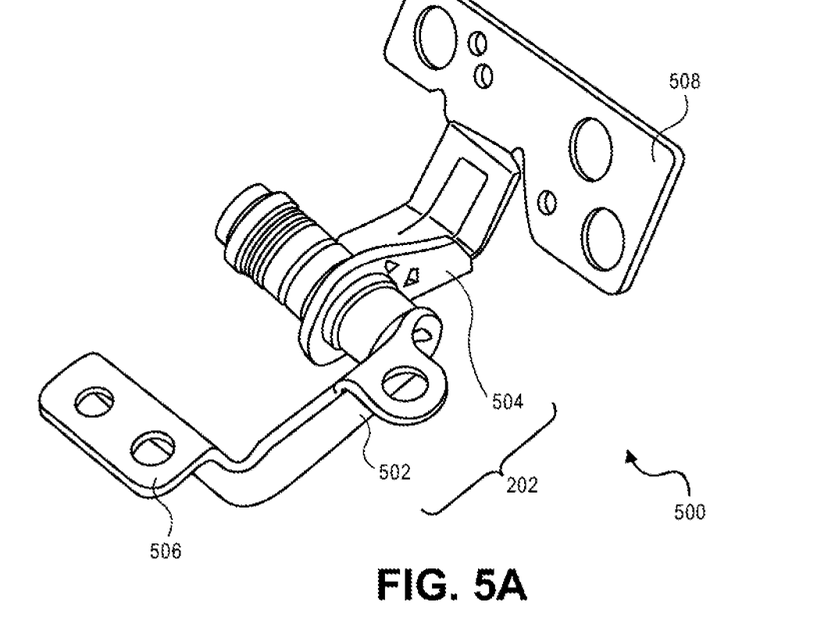
FIG. 5 is a diagram of an example hinge assembly that can be used in the example computing device of FIG. 2.

FIGS. 5A and 5B show example hinge assemblies 500 and 550, respectively. The hinge assembly 500 of FIG. 5A includes the hinge 202 that has been described, made up of a portion 502 about which another portion 504 is rotatable. The hinge assembly 500 includes a mounting plate 506 to fixedly couple to the bottom component 102 of the computing device 100 that has been described, and a mounting plate 508 to fixedly couple to the top component 104 that has been described. The mounting plates 506 and 508 can extend from the portions 502 and 504, respectively, such that the hinge 202 rotatably couples the mounting plates 506 and 508. The conductor 214 that has been described is not depicted in FIG. 5A for illustrative clarity and convenience.

Figure 5B:
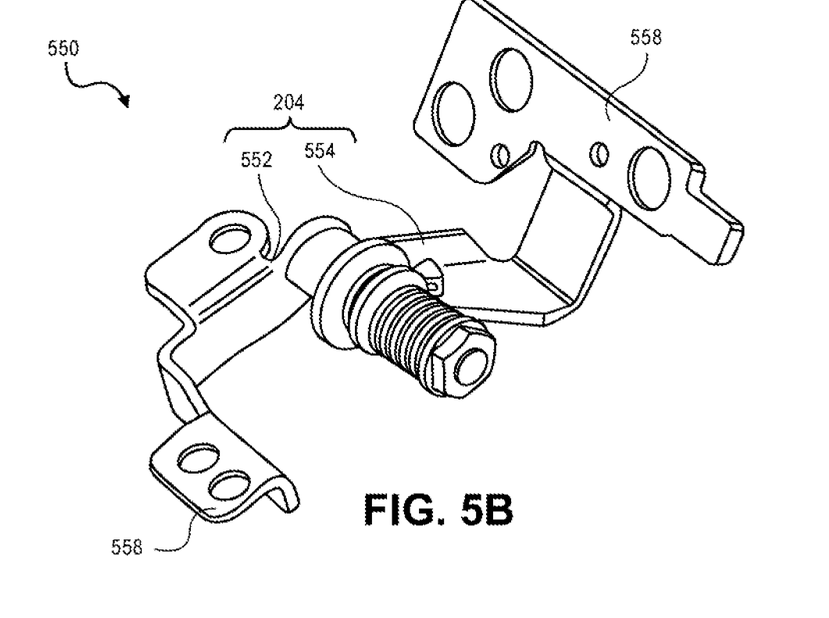

Similarly, the hinge assembly 550 of FIG. 5B includes the hinge 204 that has been described, made up of a portion 552 about which another portion 554 is rotatable. The hinge assembly 550 includes a mounting plate 556 to fixedly couple to the bottom component 102 of the computing device 100 that has been described, and a mounting plate 558 to fixedly couple to the top component 104 that has been described. The mounting plates 556 and 558 can extend from the portions 552 and 554, respectively, such that the hinge 204 rotatably couples the mounting plates 556 and 558. The hinge assemblies 500 and 550 are one example of a type of hinge assembly in relation to which the techniques described herein can be implemented.

The techniques described herein thus permit a wireless transceiver 206 of a computing device 100 to excitingly employ an antenna 212 at a top component 104 of the computing device 100 just when the top component 104 is rotated in an open position relative to a bottom component 102 of the computing device 100. This can be achieved via a flexible conductor 214 disposed within a hinge 202 of the computing device 100, which has a freely movable end 404 that makes conductive contact with the antenna 212 at the top component 104 as the top component 104 is rotated open relative to the bottom component 102. The computing device can also include an antenna 208 within the hinge 202 that the wireless transceiver 206 excitably employs regardless of the rotatable position of the top component 104 relative to the bottom component 102.

We claim:

1. A computing device comprising:
   a first component;
   a second component;
   a hinge rotatably coupling the first component and the second component, the second component rotatable about the hinge between a closed position and an open position in relation to the first component;
   a wireless transceiver;
   a first antenna;
   a first conductor conductively connecting the wireless transceiver at a first end of the first conductor and the first antenna at a second end of the first conductor;
   a second antenna disposed at the second component;
   a second conductor connecting the wireless transceiver at a first end of the second conductor; and
   a flexible conductive member disposed within the hinge and having a first end fixedly connected to the first component at a second end of the second conductor,
   wherein in the open position of the second component, a second end of the flexible conductive member conductively contacts the second antenna,
   and wherein in the closed position of the second component, the second end of the flexible conductive member does not conductively contact the second antenna.

2. The computing device of claim 1, wherein the flexible conductive member unwinds within the hinge in correspondence with rotation of the second component from the closed position to the open position.

3. The computing device of claim 2, wherein the flexible conductive member winds within the hinge in correspondence with rotation of the second component from the open position to the closed position.

4. The computing device of claim 1, wherein the flexible conductive member comprises a spring.

5. The computing device of claim 1, wherein the first antenna is disposed at the hinge.

6. The computing device of claim 1, wherein the wireless transceiver conductively connected to the first antenna, conductively connected to the second antenna in the open position of the second component, and is not conductively connected to the second antenna in the closed position of the second component.

7. The computing device of claim 6, wherein the wireless transceiver excitably uses the first antenna and not the second antenna in the closed position of the second component, and excitably uses both the first antenna and the second antenna in the open position of the second component.

8. The computing device of claim 1, further comprising:
   an input device disposed at the first component; and
   a display device disposed at the second component.

9. A computing device comprising:
   a first component;
   a second component;
   a hinge rotatably coupling the first component and the second component;
   a wireless transceiver;
   a first antenna;
   a first conductor conductively connecting the wireless transceiver at a first end of the first conductor and the first antenna at a second end of the first conductor;
   a second antenna disposed at the second component;
   a second conductor connecting the wireless transceiver at a first end of the second conductor; and
   a flexible conductive member disposed within the hinge, having a first end fixedly connected to the first component at a second end of the second conductor, and having a second end selectively making conductive contact to the second antenna in correspondence with a rotatable position of the second component relative to the first component.

10. The computing device of claim 9, wherein the flexible conductive member makes conductive contact to the second antenna in an open rotatable position of the second component relative to the first component, and does not make conductive contact to the second antenna in a closed rotatable position of the second component relative to the first component.

11. The computing device of claim 10, wherein the second end of the flexible conductive member is a movably free end, is in contact with the second component in the open rotatable position of the second component, and is not in contact with the second component in the closed rotatable position of the second component.

12. The computing device of claim 11, wherein the movably free end of moves within the hinge in correspondence with rotation of the second component between the closed rotatable position and the open rotatable position relative to the first component.

13. A hinge assembly for a computing device, comprising:
    a first mounting plate to fixedly couple to a first component of the computing device;
    a second mounting plate to fixedly couple to a second component of the computing device;
    a rotatable hinge rotatably coupling the first mounting plate and the second mounting plate;
    a first antenna to conductively connect to a second end of a first conductor of the computing device, a first end of the first conductor conductively connected to a wireless transceiver of the computing device; and a flexible conductive member having a first end to fixedly attach to a second end of a second conductor of the computing device, a first end of the second conductor conductively connected to the wireless transceiver, the flexible conductive member having a movably free second end selectively making conductive contact to a second antenna in correspondence with a rotatable position of the second component relative to the first component.

14. The hinge assembly of claim 13, wherein the second component is rotatable about the hinge between a closed position and an open position relative to the first component,
   wherein the flexible conductive member unwinds in correspondence with rotation of the second component from the closed position to the open position,
   and wherein the flexible conductive member winds in correspondence with rotation of the second component from the open position to the closed position.

15. The hinge assembly of claim 13, wherein the flexible conductive member comprises a flat tension spring having a default unwound position.

\* \* \* \* \*